United States Patent [19]
Breitbart et al.

[11] Patent Number: 5,999,931
[45] Date of Patent: Dec. 7, 1999

[54] CONCURRENCY CONTROL PROTOCOLS FOR MANAGEMENT OF REPLICATED DATA ITEMS IN A DISTRIBUTED DATABASE SYSTEM

[75] Inventors: Yuri Breitbart, Lancaster, Ky.; Henry F. Korth, Lower Gwynedd, Pa.; Abraham Silberschatz, Summit, N.J.

[73] Assignee: Lucent Technologies Inc., Murray Hill, N.J.

[21] Appl. No.: 08/953,571

[22] Filed: Oct. 17, 1997

[51] Int. Cl.$^6$ ................................................. G06F 17/30
[52] U.S. Cl. ........................... 707/10; 707/8; 709/104
[58] Field of Search .................... 707/10, 8; 395/671, 395/674, 677; 709/104

[56] References Cited

U.S. PATENT DOCUMENTS

| | | | |
|---|---|---|---|
| 4,432,057 | 2/1984 | Daniell et al. | 707/8 |
| 5,459,871 | 10/1995 | Van Den Berg | 395/674 |
| 5,504,899 | 4/1996 | Raz | 707/10 |
| 5,504,900 | 4/1996 | Raz | 707/10 |
| 5,701,480 | 12/1997 | Raz | 395/671 |
| 5,734,817 | 3/1998 | Roffe et al. | 395/182.13 |
| 5,781,910 | 7/1998 | Gostanian et al. | 707/201 |
| 5,835,766 | 11/1998 | Iba et al. | 709/104 |

OTHER PUBLICATIONS

A.A. Helal, A.A. Heddaya and B.B. Bhargawa, "Replication Techniques in Distributed Systems," Kluwer Academic Publishers, 1996.

C. Pu and A. Leff, "Replica Control in Distributed Systems: an Asynchronous Approach," Proceedings of ACM–SIGMOD 1991 International Conference on Management of Data, Denver, Colorado, pp. 377–386, May 1991.

J. Sidell, P.M. Aoki, S. Barr, A. Sah, C. Staelin, M. Stonebraker and A. Yu, "Data Replication in Mariposa," Proceedings of the Twelfth International Conference on Data Engineering, New Orleans, Louisiana, 1996.

E. Holler, "Multiple Copy Update," Lecture Notes in Computer Science, Distributed Systems–Architecture and Implementation: An Advanced Course, Springer–Verlag, Berlin, 1981.

H.F. Korth, E. Levy and A. Silberschatz, "A Formal Approach to Recovery by Compensating Transactions," Proceedings of the Sixteenth International Conference on Very Large Databases, Brisbane, Australia, pp. 95–106, Aug., 1990.

(List continued on next page.)

*Primary Examiner*—Paul R. Lintz
*Assistant Examiner*—Ella Colbert

[57] ABSTRACT

The invention provides protocols for managing transactions operating on replicated data items at multiple physical sites in a distributed database system. The protocols make use of dynamically changing sets of data items referred to as "virtual sites" and a replication graph or other suitable globally consistent representation of the relationships between the transactions and the virtual sites. Illustrative embodiments of the invention include a static global serializability (SGS) protocol, a commit-oriented protocol (COP) and a multiversion optimistic protocol (MOP). The SGS protocol broadcasts the data access set of a given transaction to all physical sites, and applies the Thomas Write Rule (TWR) to write-write conflicts on secondary copies of data items. The COP protocol defers testing of the replication graph until a transaction is ready to commit, and each transaction is allowed to proceed at its origination site independently of other transactions that are executing at other sites. The MOP protocol uses two versions of each data item to ensure global multiversion serializability. The two versions are the current version of the data item, and a "last certified version" of the data item. All read-only transactions read the last certified version, and can therefore proceed without delay. The protocols ensure global serializability while substantially reducing communication overhead relative to conventional protocols.

20 Claims, 7 Drawing Sheets

OTHER PUBLICATIONS

J. Gray, P. Helland, P. O'Neil and D. Shasha, "The Dangers of Replication and a Solution," Proceedings of ACM–SIGMOD 1996 International Conference on Management of Data, Montreal, Quebec, pp. 173–182, 1996.

P. Chundi, D.J. Rosenkrantz and S.S. Ravi, "Deferred Updates and Data Placement in Distributed Databases," Proceedings of the Twelfth International Conference on Data Engineering, New Orleans, Louisiana, 1996.

H.F. Korth and T.I. Imielinski, "Introduction to Mobile Computing," in Mobile Computing, pp. 1–39, Kluwer Academic Publishers, 1996.

Y. Breitbart, H. Garcia–Molina and A. Silberschatz, "Overview of Multidatabase Transaction Management," VLDB Journal, 1(2), 1992.

C.A. Ellis, "Consistency and Correctness of Duplicate Database Systems," Operating Systems Review, 11(5), Nov. 1977.

R.H. Thomas, "A Solution to the Concurrency Control Problem for Multiple Copy Databases," CompCon78, 1978.

T. Minoura, "A New Concurrency Control Algorithm for Distributed Database Systems," Proceedings of the Fourth Berkeley Workshop on Distributed and Computer Networks, pp. 221–234, Aug. 1979.

H.F. Korth et al., "A Framework for Understanding Distributed (Deadlock Detection) Algorithms," ACM 0–89791–097, pp. 192–201, 1983.

J. Gray, P. Homan, R. Obermack and H. Korth, "A Strawman Analysis of Probability of Waiting and Deadlock," IBM Research Report, IBM Research Laboratory, San Jose, CA, Feb. 1981.

K.M. Chandy and J. Misra, "Distributed Deadlock Detection," ACM Transactions on Computer Systems, vol. 1, No. 2, pp. 144–156, May 1983.

E. Gelenber and K. Sevcik, "Analysis of Update Synchronization for Multiple Copy Databases," Proceedings of the Third Berkeley Workshop on Distributed Databases and Computer Networks, pp. 69–90, Aug. 1978.

Y. Breitbart and H.F. Korth, "Replication and Consistency: Being Lazy Helps Sometimes," Proceedings of the Sixteenth ACM SIGACT–SIGMOD–SIGART Symposium on Principles of Database Systems, Tucson, Arizona, May 1997.

AFTER STEP $c_1^1$ $T_1$ - COMMITTED AT $S_1$, BUT NOT COMPLETED
$T_2$ - NOT YET STARTED
$T_3$ - NOT YET STARTED

AFTER STEP $c_1^2$ $T_1$ - COMMITTED EVERYWHERE, BUT NOT COMPLETED
$T_2$ - NOT YET STARTED
$T_3$ - ACTIVE (AND PRECEDES $T_1$ AT SITE $S_2$)

AFTER STEP $c_2^1$ $T_1$ - COMMITTED EVERYWHERE, BUT NOT COMPLETED
$T_2$ - COMMITTED AT SITE $S_1$, BUT NOT COMPLETED
$T_3$ - ACTIVE (AND PRECEDES $T_1$ AT SITE $S_2$)

AFTER STEP $c_2^2$ $T_1$ - COMMITTED EVERYWHERE, BUT NOT COMPLETED
$T_2$ - COMMITTED EVERYWHERE, BUT NOT COMPLETED
$T_3$ - ACTIVE (AND PRECEDES $T_1$ AT SITE $S_2$)

TESTING AFTER SUBMISSION OF STEP $c_3^2$ (BOX 72 IN FIG. 4A)

CYCLE → $T_3$ ABORTS
$T_1$, $T_2$ ARE ABLE TO COMPLETE AFTER $T_3$ ABORTS

CONCURRENCY CONTROL PROTOCOLS FOR MANAGEMENT OF REPLICATED DATA ITEMS IN A DISTRIBUTED DATABASE SYSTEM

FIELD OF THE INVENTION

The present invention relates generally to database management techniques, and more particularly to techniques for managing access and updates to replicated data items at multiple sites in a distributed database system.

BACKGROUND OF THE INVENTION

A distributed database system typically includes a number of physical sites connected by a network. The physical sites may be, for example, centralized database systems such as data warehouses or data marts, or remote customer sites such as automatic teller machines or desktop personal computers. Many database systems support data processing transactions at multiple user sites. For example, a transaction operating at a particular user site may access a primary copy of a data item or record of a central database, while transactions at other user sites utilize replicated versions of the data item. A significant problem arises when the transactions at the different user sites attempt to update different replicated versions of the same data item, which may result in inconsistent replicated versions of a given data item. The problem of concurrent access to consistent replicated data has become increasingly challenging with the advent of large-scale distributed data warehouses and data marts, and the increasing use of distributed data in often-disconnected mobile computers. For example, data warehouses or data marts are now typically configured with storage capacities on the order of 0.5 to 3 terabytes, with approximately 10% to 25% of the stored data items being used in a replicated form, and about 10% of the data items being updated each day. These systems may require that all data item updates be reflected within a relatively short time period, such as 10 minutes or less. Other features of distributed database systems are described in, for example, A. A. Helal, A. A. Heddaya and B. B. Bhargava, "Replication Techniques in Distributed Systems," Kluwer Academic Publishers, 1996; C. Pu and A. Leff, "Replica Control in Distributed Systems: an Asynchronous Approach," Proceedings of ACM-SIGMOD 1991 International Conference on Management of Data, Denver, Colo., pp.377–386, May 1991; and J. Sidell, P. M. Aoki, S. Barr, A. Sah, C. Staelin, M. Stonebraker and A. Yu, "Data Replication in Mariposa," Proceedings of the Twelfth International Conference on Data Engineering, New Orleans, La., 1996, all of which are incorporated by reference herein.

In order to ensure that multiple concurrent transactions have access to consistent replicated data, it is important to determine whether a proposed schedule of transaction operations is globally serializable. A schedule of transaction operations is "serializable" if running the transactions concurrently in accordance with the schedule yields the same results as running the transactions in some sequential order. Global serializability refers to serializability as applied to execution of all transactions in a system regardless of the physical sites at which particular transactions operate. The serializability of a given schedule of transaction operations depends in large part on the techniques used to update replicated data items. A number of so-called "eager" update propagation techniques are described in E. Holler, "Multiple Copy Update," Lecture Notes in Computer Science, Distributed Systems-Architecture and Implementation: An Advanced Course, Springer-Verlag, Berlin, 1981, which is incorporated by reference herein. However, these techniques are often unsuitable for use with large-scale distributed systems. In a typical eager propagation technique, the number of deadlocks, in which transactions are subject to an unending cycle of waits, increases as the cube of the number of user sites and as the fourth power of transaction size. This is particularly problematic with relatively long data-mining queries, which typically access many different data items, and with mobile transactions which effectively live for a long period of time if the portable computer or other mobile computing device is disconnected. Deadlocks are thus no longer rare events with a negligible impact on performance, but instead present a substantial barrier to the efficient operation of large-scale distributed database systems.

Other known update techniques, generally referred to as "lazy" propagation techniques, address the above-described update propagation problem. Under lazy propagation, only one replica of a particular data item is updated by a transaction utilizing that data item. A separate transaction runs on behalf of the original transaction at each site at which update propagation is required. Lazy propagation effectively reduces transaction size but creates the possibility of two or more transactions committing conflicting updates to a data item if the transactions operate on different replicas. For example, a transaction $T_1$ could update a data item d using the replica at a site $s_1$ while a transaction $T_2$ updates the replica of d at another site $s_2$. If both transactions $T_1$ and $T_2$ commit an update of their replicas of the data item, the distributed system discovers the conflict only when the updates are propagated. Such conflicts may require either update reconciliation or the use of compensating transactions, as described in H. F. Korth, E. Levy and A. Silberschatz, "A Formal Approach to Recovery by Compensating Transactions," Proceedings of the Sixteenth International Conference on Very Large Databases, Brisbane, Australia, pp. 95–106, August, 1990, which is incorporated by reference herein.

Consistency can be ensured despite lazy propagation by directing all updates to a primary copy of the data item, and employing an appropriate concurrency-control protocol. The process of directing all updates to a primary copy of the data item is referred to as the lazy-master approach to update regulation in J. Gray, P. Helland, P. O'Neil and D. Shasha, "The Dangers of Replication and a Solution," Proceedings of ACM-SIGMOD 1996 International Conference on Management of Data, Montreal, Quebec, pp. 173–182, 1996, which is incorporated by reference herein. Unfortunately, these and other previous techniques for managing transaction updates in accordance with the lazy-master approach either fail to guarantee consistency, or are subject to a prohibitive number of deadlocks, or both.

Conventional lazy propagation techniques may also cause an update transaction to read "old" replicas of some data items, resulting in an execution that generates an inconsistent database state. The problem may be alleviated to some extent by augmenting the above-noted lazy-master approach with restrictions on how the primary copies of data items are selected, as described in P. Chundi, D. J. Rosenkrantz and S. S. Ravi, "Deferred Updates and Data Placement in Distributed Databases," Proceedings of the Twelfth International Conference on Data Engineering, New Orleans, La., 1996, which is incorporated by reference herein. However, the resulting update propagation remains unduly susceptible to deadlocks and therefore is unsuitable for use in applications such as large-scale distributed systems with mobile computers.

An improved set of update propagation techniques which can guarantee global serializability is described in U.S. patent application Ser. No. 08/843,196 of Yuri Breitbart and Henry F. Korth, filed Apr. 14, 1997 and entitled "Method and System for Managing Replicated Data with Enhanced Consistency and Concurrency," which is incorporated by reference herein. These techniques significantly reduce communication overhead and the probability of distributed deadlock. Although these techniques provide substantial advantages over the other techniques noted above, it would nonetheless be desirable in many database management applications to provide further reductions in communication overhead as well as additional performance improvements.

SUMMARY OF THE INVENTION

The invention provides concurrency-control techniques for managing replicated data in a distributed database system. The techniques may be used to generate a globally serializable transaction schedule for the various physical sites of the system, while substantially reducing communication overhead relative to that of conventional techniques. The invention provides rules for global transaction management over all physical sites of the system, making use of dynamically changing sets of data items referred to as "virtual sites," and a replication graph, copy graph or other globally consistent representation of the relationships between transactions and the virtual sites. In accordance with one aspect of the invention, a given transaction $T_i$ is permitted to enter a completed state even if $T_i$ has not finished updating all replicated data items in the sets of data items associated with $T_i$. The transaction $T_i$ and any sets of data items $S_i^j$ associated therewith are removed from the representation when $T_i$ enters the completed state. This broad definition of a completed state significantly extends the class of globally serializable schedules which can be generated, while at the same time improving transaction throughput.

A first illustrative concurrency-control technique in accordance with the invention is referred to as a static global serializability (SGS) protocol. As part of this protocol, a given transaction $T_i$ submits its set of data items in a preprocessing step, the transaction is assigned a timestamp, and the set is broadcast to all physical sites in the system. The origination site of a given transaction $T_i$ determines whether a cycle will be created in the replication graph if $T_i$ is allowed to proceed. If $T_i$ will not create a cycle in the graph, it is allowed to proceed at its origination site. When $T_i$ submits a write operation on a secondary copy of a data item, the timestamp of $T_i$ is compared to that of the transaction which executed the last write operation the same data item. If the $T_i$ timestamp is less than that of the last write on the data item, the $T_i$ write operation is not performed. Otherwise, the $T_i$ write operation is sent to the local database management system for execution. Transaction $T_i$ is removed from the replication graph when $T_i$ enters the above-described completed state. The SGS protocol thus applies a technique known as the Thomas Write Rule (TWR) to write-write conflicts on secondary copies of data items, and thereby achieves substantially reduced communication overhead.

A second illustrative concurrency-control technique in accordance with the invention is referred to as a commit-oriented protocol (COP). This protocol defers testing of a replication graph or other suitable globally consistent representation until a transaction is ready to commit. Each transaction is allowed to proceed at its origination site independently of other transactions that are executing at other sites. The only coordination required is when a given transaction $T_i$ submits the commit operation at its origination site. In this case, the transaction $T_i$ and its virtual sites are tentatively included in the replication graph, and a determination is made as to whether the resulting graph is acyclic. If the resulting graph is acyclic, the tentative changes are made permanent, and the commit operation is performed. Otherwise, the transaction $T_i$ is aborted. In this protocol, none of the transactions is permitted to wait, and therefore no distributed deadlocks can occur during transaction processing. The above-noted illustrative SGS and COP protocols guarantee global serializability and freedom from distributed deadlock without relying on any particular properties of the local database management systems running at the physical sites. In comparison to prior protocols, the new protocols reduce the communication required to coordinate transactions by approximately a factor of r, where r is the average number of operations per transaction.

An illustrative multiversion concurrency-control technique in accordance with the invention is referred to as a multiversion optimistic protocol (MOP), and uses two versions of each data item to ensure global multiversion serializability. The two versions are the current version of the data item and a "last certified version" of the data item. The last certified version of a data item a is that version written by a completed transaction $T_i$ such that any other completed transaction that writes a precedes $T_i$ in the global serialization order. The read-only transactions read the last certified version of a given data item. This use of two versions of a given data item allows local read-only transactions to proceed without coordination and therefore without delay, and the protocol ensures that each read-only transaction reads a consistent database state, although the consistent state may not be the most recent.

DETAILED DESCRIPTION OF THE INVENTION

The present invention will be illustrated below in conjunction with exemplary distributed database configurations. It should be understood, however, that the invention is not limited to use with any particular type of database or database configuration, but is instead more generally applicable to any database application in which it is desirable to provide consistency and concurrency across multiple replicated versions of data items. The term "data item" as used herein refers to a stored data element, a set of stored data elements, a record or any other type of data stored in a database or other storage system. The term "physical site" is intended to include remote customer sites, central databases, portable computers or other mobile computing devices, as well as any other physical location at which a data item may be processed. A "virtual site" refers generally to a set of data items accessed by a particular transaction at a particular physical site. A given virtual site $VS_i^j$ includes a set of data items $S_i^j$ which are accessed by a transaction $T_i$ at a physical site $s_j$. The term "transaction" as used herein refers to any sequence of data processing operations which involves reading, writing or otherwise utilizing a data item or items, and which can be terminated by either a commit or an abort operation. The term "committed" refers to the state of a transaction which has executed all of its operations which were to be performed at its origination site. The term "replication graph" refers to an exemplary representation of relationships between transactions and virtual sites, and includes a first set of identifiers for at least a subset of the transactions and a second set of identifiers for at least a subset of the virtual sites. The term "distributed database system" should be understood to refer to any type of system in which data items are stored or processed in multiple physical sites. As noted above, a schedule of transaction operations is "serializable" if running the transactions concurrently in accordance with the schedule yields the same results as running the transactions in some sequential order. Global serializability refers to serializability as applied to execution of all transactions in a system regardless of the physical sites at which particular transactions operate.

Figure 1:
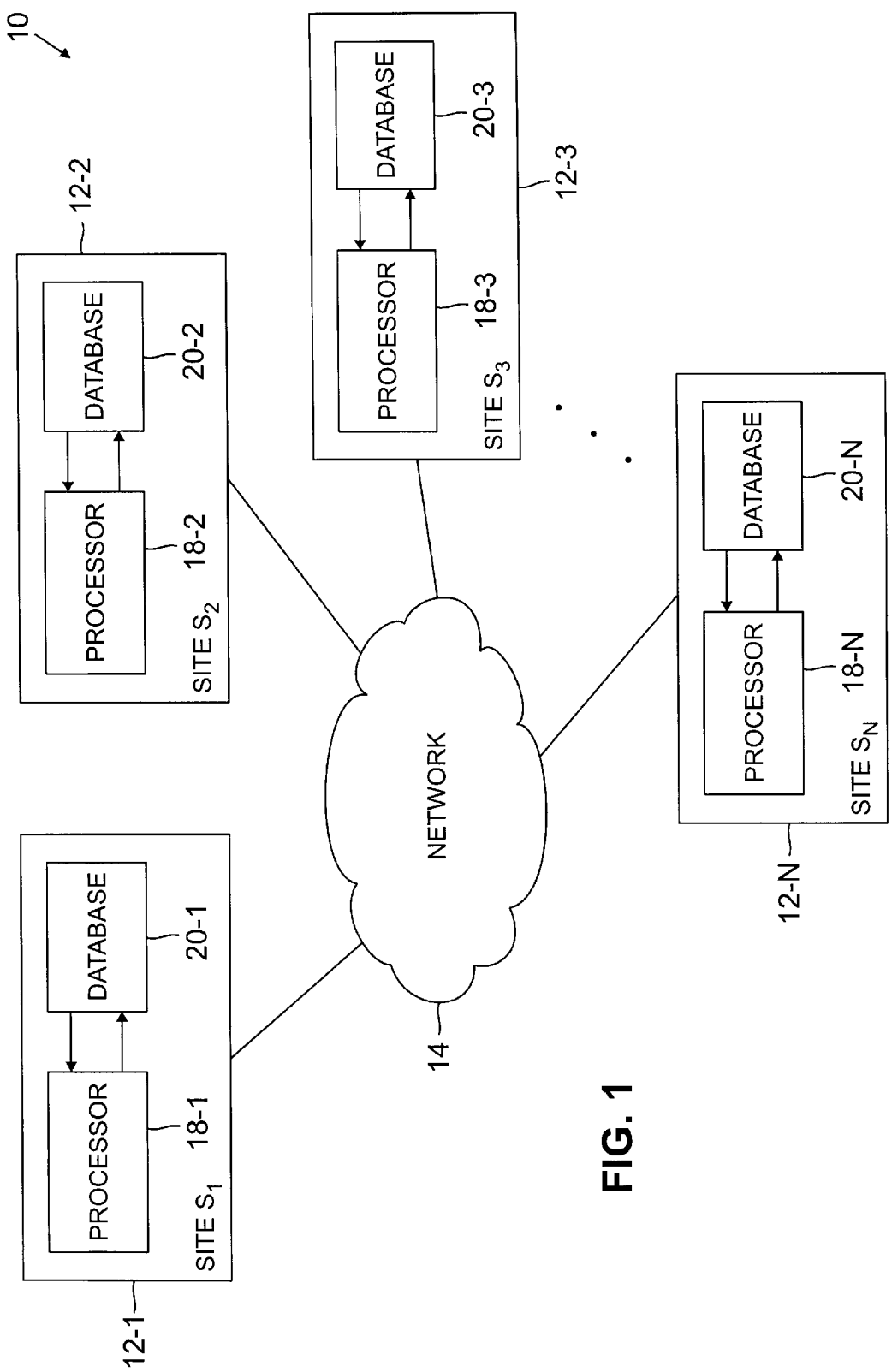
FIG. 1 shows an exemplary distributed database system in which the concurrency-control techniques of the present invention may be implemented.

FIG. 1 shows an exemplary distributed database system 10 in which the present invention may be implemented. The system 10 includes N physical sites 12-i, i=1, 2, . . . N connected by a network 14. The network 14 may be a local area network, a metropolitan area network, a wide area network, a global data communications network such as the Internet, a private "intranet" or "extranet" network or any other suitable data communication medium. The physical sites 12-i may be centralized database systems such as data warehouses or data marts, remote customer sites such as automatic teller machines or desktop personal computers, portable computers or other mobile computing devices, or any other type of data processors. The operation of mobile computing devices in a distributed database system is described in greater detail in H. F. Korth and T. I. Imielinski, "Introduction to Mobile Computing," in Mobile Computing, pp. 1–39, Kluwer Academic Publishers, 1996, which is incorporated by reference herein. Certain of the interconnections between the various elements of the system 10 may be via relatively low-speed telephone line modem connections, such that network bandwidth is a scarce resource and the round-trip time for a message and acknowledgment is relatively large. Each of the N physical sites 12-i includes a processor 18-i and a database 20-i. The database 20-i may be, for example, a large centralized database system, or a memory of a desktop computer, a portable personal computer, a personal digital assistant (PDA) or other processing device, depending upon the nature of the corresponding physical site 12-i.

At least a subset of the processors 18-i each run a local database management system such as that described in A. Silberschatz, H. F. Korth and S. Sudarshan, "Database System Concepts," 3rd edition, McGraw-Hill, 1997, which is incorporated by reference herein. The execution of transactions in local database management systems is further described in J. Gray and A. Reuter, "Transaction Processing: Concepts and Techniques," Morgan-Kaufmann, San Mateo, Calif., 1993, which is incorporated by reference herein. The processors 18-i can be implemented as personal, micro or mainframe computers, workstations, microprocessors, central processing units, application-specific integrated circuits (ASICs) or other digital data processors, as well as various portions or combinations thereof. The databases 20-i may utilize electronic, magnetic or optical storage media, or various combinations thereof, and as previously noted may represent storage locations of data warehouses or data marts having storage capacities of up to a few terabytes, or memories of desktop or portable computers. The storage and retrieval of data items from a database 20-i of a given site 12-i is controlled by the corresponding processor 18-i using the local database management system such that serializability and other desirable properties are maintained. The physical sites 12-i of system 10 may each run multiple transactions, such as read and write transactions, during which data items stored at other sites are accessed and processed. As noted previously, such transactions can create consistency and concurrency problems in that a replicated data item processed at one site may be updated by a transaction running at that site while another non-updated replicated version is used by a transaction running at another site.

A transaction $T_i$ that runs at only one of the physical sites 12-i of system 10 is referred to herein as a local transaction, while a transaction that runs at multiple physical sites is referred to as a global transaction. It will be assumed without limitation for purposes of the illustrative embodiments described herein that each transaction $T_i$ is restricted to read data only at the site at which the transaction originates, referred to as the origination site $o(T_i)$ of $T_i$. All read-only transactions will therefore be assumed to be local transactions. In an embodiment in which a transaction needs to read data not available locally, a local replica may be created outside of the transaction execution. It will also be assumed that, for a given data item a, there is a particular physical site p(a), called the primary site of a, and that only transactions $T_i$ originating at the primary site p(a) may update data item a at the primary site p(a). That is, transaction $T_i$ can update the copy of data item a at the primary site p(a) only if $o(T_i)=p(a)$. The copy of a located at primary site p(a) is referred to as the primary copy, while all other copies of a are referred to as secondary copies, replicated copies or simply replicas. Although the latter assumption given above limits the sets of data items that may be updated within a single transaction, a wide variety of practical database system applications, including applications in which each data item has a specific "owner," operate within this restriction.

An update transaction $T_i$ that updates only non-replicated data items is a local transaction, in accordance with the above-noted assumptions regarding reading and updating. Similarly, an update transaction that updates at least one replicated data item is a global transaction. A global transaction may be represented by several local sub-transactions: one for the transaction itself running at its origination site, and one for each physical site that holds replicas of one or more data items updated by the transaction. In an exemplary embodiment of the invention, the sub-transactions running at remote sites on behalf of a global transaction do not begin until after the global transaction is in the committed state. In accordance with the invention, once a transaction $T_i$ is in the committed state, it commits independently at all physical sites at which it runs. By way of example, when a primary copy of a data item a is updated, the new value of a must be propagated to all other physical sites where a is replicated. This propagation can commence at any time. However, the secondary copies of a are updated only after the transaction updating the primary copy of a has committed at the primary site of a.

The above assumptions lead to the following results. If two transactions $T_i$ and $T_j$ both include a write operation on the same data item a, then $o(T_i)=o(T_j)$. If transactions $T_i$ and $T_j$ write a data item a at site $s_l$, then the two transactions either have originated at $s_l$ or update a secondary copy of a at $s_l$. In the latter case, both of the transactions must have updated a at $p(a)=o(T_i)=o(T_j)$. Since a transaction can perform its read operations only at its origination site, a global transaction in accordance with the above assumptions cannot have any read operations at sites where it updates secondary copies. It should again be emphasized that the assumptions given herein are not requirements of the invention, but are instead intended to illustrate exemplary embodiments of the invention.

The combination of local transaction schedules is referred to herein as a global schedule. In the illustrative embodiments, a global schedule is globally serializable if and only if there is a total order of all transactions such that if $T_i$ precedes $T_j$ in the total order, then $T_i$ is serialized before $T_j$ in all local schedules in which these two transactions are executed together. Following the notation of Y. Breitbart, H. Garcia-Molina and A. Silberschatz, "Overview of Multidatabase Transaction Management," VLDB Journal, 1(2), 1992, which is incorporated by reference herein, a schedule S over a set of transactions T is an sp-schedule if and only if there exists a mapping sp from T such that: (1) if $T_i$ is in T, then $sp(T_i)$ is an operation of $T_i$; and (2) if $T_i$ and $T_j$ are in T, and $sp(T_i)$ occurs before $sp(T_j)$ in S, then there exists a serial schedule equivalent to S in which $T_i$ precedes $T_j$. As shown in the above-cited Y. Breitbart, H. Garcia-Molina and A. Silberschatz reference, not every local schedule is an sp-schedule. If a schedule is an sp-schedule, then $sp(T_i)$ is called the "serialization point operation" or sp-operation of $T_i$.

As described in the above-cited U.S. patent application of Yuri Breitbart and Henry F. Korth, each physical site of a distributed database system such as system 10 may have a dynamically changing set of virtual sites associated with it, and a concurrency-control protocol may be used to provide global transaction management over the set of virtual sites. Local transaction management within a given virtual site is provided by the local database management system (DBMS) running at the physical site containing the given virtual site. The replication management techniques of the invention may be part of an integrated system and can therefore utilize the transaction management information from the local DBMSs. This is a significant advantage of the invention over conventional multidatabase systems such as those described in Y. Breitbart, H. Garcia-Molina and A. Silberschatz, "Overview of Multidatabase Transaction Management," VLDB Journal, 1(2), 1992.

A given transaction $T_i$ may be in one of a number of distinct global states at any particular time. It will be assumed for the following description that $T_i$ may be in one of four global states at a given point in time: (1) aborted, if $T_i$ has aborted at its origination site $o(T_i)$; (2) active, if $T_i$ is neither committed nor aborted at its origination site; (3) committed, if $T_i$ is committed at its origination site, but is not yet in the completed state; and (4) completed, if $T_i$ is not preceded by any non-completed transaction in the local serialization order at a physical site $s_1$ at which $T_i$ executes, and at least one of the following hold: (i) $T_i$ has executed its sp-operation at each physical site at which it executes; or (ii) $T_i$ has committed at each physical site at which it executes.

A transaction $T_i$ is therefore permitted to be in the completed state even if it did not finish updating of all replicas of data items. As long as it can be ensured that no violation of global serializability could occur as a result of some future operations of local or global transactions, it is unnecessary to wait for global transactions to commit everywhere to satisfy the first condition of completeness. The present invention thus extends the notion of a completed state in order to extend significantly the class of globally serializable schedules which can be generated, while at the same time improving the transaction throughput. If a global transaction is in the committed state, then it may have performed some of its updates at secondary copy sites. Every transaction eventually enters either the committed or the aborted state. However, even if a transaction has committed at all sites, it does not necessarily enter into the completed state.

Figure 2A:
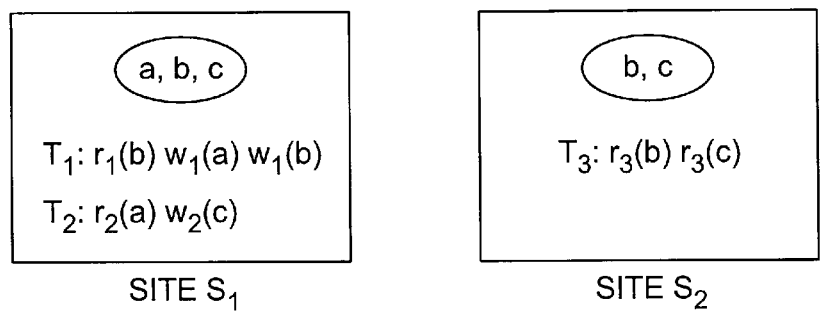
FIGS. 2A through 2F illustrate an exemplary set of transactions operating on replicated data items at two physical sites in the distributed database system of FIG. 1, and corresponding replication graphs generated at different stages in the transaction processing.

FIG. 2A illustrates a pair of physical sites $s_1$ and $s_2$ of a distributed database system such as system 10 of FIG. 1. The physical site $s_1$ contains primary copies of data items a, b and c, while the physical site $s_2$ contains secondary replicated copies of data items b and c. Three transactions $T_1$, $T_2$ and $T_3$ are operating at the physical sites $s_1$ and $s_2$, as shown in FIG. 2A. Transactions $T_1$ and $T_2$ originate at site $s_1$, while transaction $T_3$ originates at site $s_2$. The notation $r_i(d)$ denotes an operation in which the transaction $T_i$ reads data item d. Similarly, $w_i^j(d)$ denotes an operation in which transaction $T_i$ writes to data item d at physical site $s_j$. Transaction $T_1$ includes the sequence of operations $r_1(b)\ w_1(a)\ w_1(b)$, indicating that $T_1$ involves reading data item b, writing to data item a and then writing to data item b. Transaction $T_2$ includes the sequence of operations $r_2(a)\ w_2(c)$, indicating that $T_2$ involves reading data item a and then writing to data item c. Transaction $T_3$ includes the sequence of operations $r_3(b)r_3(c)$, indicating that $T_3$ involves reading data item b and then reading data item c. The global execution order of the various operations of transactions $T_1$, $T_2$ and $T_3$ is shown in FIG. 2A and is given by:

$$r_1(b)w_1^1(a)w_1^1(b)c_1^1 r_3(b)w_1^2(b)c_1^2 r_2(a)w_2^1(c)c_2^1 w_1^2(c)c_2^2 r_3(c)c_3^2$$

where $c_i^j$ designates a commitment by a transaction $T_i$ at a site $s_j$. It should be noted that this global execution order includes explicitly not only writes to primary copies of data items but also all writes to replicas. The writes to the replicas may proceed in accordance with a lazy update protocol. The following local operation schedules are generated at the physical sites $s_1$ and $S_2$:

$$s_1: r_1(b)w_1^1(a)w_1^1(b)c_1^1\ r_2(a)w_2^1(c)c_2^1$$

$$s_2:\ r_3(b)w_1^2(b)w_1^2(b)c_1^2\ w_2^2(c)c_2^2\ r_3(c)c_3^2$$

It is readily apparent that the above schedule is not globally serializable. For example, $T_1$ precedes $T_2$ at site $s_1$, while at site $s_2$, $T_2$ precedes $T_3$ which precedes $T_1$. At the point where $T_1$ has committed at every site at which it executes, as indicated by the arrow in the global schedule of FIG. 2A, $T_3$ is still active. In accordance with the state definitions given above, $T_1$ is not in the completed state, although it is committed everywhere. If a global concurrency-control protocol chose to no longer track $T_1$ at this point, it would generally not be possible to detect the non-serializability of the execution. The update management techniques of the present invention therefore retain transactions like $T_1$ until the transactions enter the above-described completed state. Once a transaction is in the completed state, it is generally safe to remove it from consideration by the protocol.

The virtual-site management aspects of the invention will now be described in greater detail. In the following, an "access" of a data item a at physical site s by transaction $T_i$ means that $T_i$ has executed a read of a at s or has executed a write of any replicated copy of a at any physical site. The standard definition of a conflict is used, but the description may distinguish among write-write (ww) conflicts, read-write (rw) conflicts, and write-read (wr) conflicts. The rw and wr conflicts will be collectively referred to as r-conflicts. A standard definition of conflict between read and write operations is given in P. A. Bernstein, V. Hadzilacos and N. Goodman, "Concurrency Control and Recovery in Database Systems," Addison-Wesley, Reading, Mass., 1987, which is incorporated by reference herein.

To guarantee global serializability, global transactions should compete for physical sites as a resource. Since the number of global transactions is usually much higher than the number of physical sites, contention may be high, resulting in a high probability of waits and deadlocks. This situation may be improved through the notion of virtual sites. As described in the above-cited U.S. patent application of Yuri Breitbart and Henry F. Korth, each transaction $T_i$ may have a virtual site associated with it at each physical site at which it executes from the time the transaction begins until the concurrency-control protocol explicitly removes it from consideration. The virtual site for a transaction $T_i$ at a physical site $s_j$ is denoted herein as $VS_i^j$. The virtual site $VS_i^j$ includes a set of data items $S_i^j$ which are accessed by transaction $T_i$ at physical site $s_j$. The set of virtual sites is constructed and maintained based on three rules, referred to as the locality rule, the union rule and the split rule. The present invention makes use of different union and split rules than those described in the above-cited U.S. Patent Application. The union and split rules of the present invention are based on conflicts at the origination site of a transaction, and only r-conflicts at other physical sites. This tends to weaken the union rule, thereby keeping virtual sites smaller. The split rule is strengthened through its reliance on a weaker union rule, thus allowing more aggressive splitting of virtual sites when a transaction is removed due to its entry into the completed or aborted transaction states. These and other distinctions of the present invention allow greater concurrency.

The locality rule specifies that all data items that a transaction $T_i$ has accessed so far at a given physical site $s_k$ belong to the virtual site $VS_i^k$ of $T_i$ at $s_k$. Transaction $T_i$ executes at exactly one virtual site at each physical site at which it executes. Read-only transactions will have only one virtual site. Similarly, update transactions that do not update replicated data items have only one virtual site. A global update transaction, however, will have several virtual sites, one at each physical site at which it executes.

The union rule specifies that if two transactions $T_i$ and $T_j$ conflict, directly or indirectly, on a primary copy of a data item at physical site $s_k$, or r-conflict, directly or indirectly, on a replicated copy of a data item at physical site $s_k$, then the virtual sites of $T_i$ and $T_j$ at site $s_k$ at a given point in time are the same and include the set of data items accessed by transactions $T_i$ or $T_j$ at physical site $s_k$ up to that point in time. The notions of direct and indirect conflict referred to herein should be interpreted in accordance with well-known standard conflict definitions as described in, for example, the above-cited P. A. Bernstein, V. Hadzilacos and N. Goodman reference. As noted above, a transaction is said to access a data item a at site s if it has executed a read of a at s or has executed a write of any replicated copy of a regardless of site. If an access to a data item a by $T_i$ causes a conflict on a primary copy or an r-conflict on a secondary copy with $T_j$ at physical site $s_k$, then the virtual sites of $T_i$ and $T_j$ at site $s_k$ must be the same, that is, $VS_i^k = VS_j^k$, and must contain all data items at $s_k$ accessed so far by $T_i$ or by $T_j$.

The split rule is directed to keeping the virtual sites as small as possible, and is invoked to split or shrink the virtual sites when a transaction $T_i$ enters the aborted or completed state. The split rule specifies that when a physical site $s_j$ determines that $T_i$ has entered either the aborted or the completed state, any data items accessed only by $T_i$ are removed from the virtual site $VS_i^j$ and the concurrency-control protocol need no longer consider $T_i$. In addition, if transactions $T_m$ and $T_n$ have a conflicting operation with $T_i$ at a physical site $s_l = o(T_i)$ or an r-conflicting operation with $T_i$ at a physical site $s_l \neq o(T_i)$, then the virtual sites of $T_m$ and $T_n$ at physical $s_l$ are separated into two virtual sites by having each of these virtual sites contain data items of $T_m$ and $T_n$, respectively, subject to the union rule.

It should be noted that it is generally always possible to select a set of virtual sites for a given set of transactions. If a selected set of virtual sites satisfies the locality, union and split rules, such a set is deemed an acceptable set of virtual sites for a given set of transactions. For a given set of transactions there is generally at least one set of acceptable virtual sites. More particularly, the set of physical sites at which the transactions are executing may represent an acceptable set of virtual sites.

The concurrency-control techniques of the present invention may associate a replication graph with a set of transactions to represent conflicts arising from updates to replicated data. A single, global replication graph may be used for an entire distributed database system. The replication graph may be considered an undirected bipartite graph $RG = <T \cup V, E>$, where T is a set of transactions and V is the set of all virtual sites for transactions in T. At a given point in time, an edge $<VS_i^j, T_i>$ is added to the set of replication graph edges E under certain conditions. It should be noted that a replication graph for a global schedule S is not necessarily unique, since for a given set of transactions there may be many acceptable sets of virtual sites. In addition, it can be shown that if there is an acyclic replication graph for a given global schedule S, then the schedule S is globally serializable. The techniques described herein remove edges from the replication graph when the edges are no longer needed for serializability. The replication graph is checked for cycles as the concurrency-control protocol generates the global schedule S. It is generally not necessary to maintain a replication graph for the entire schedule S. Instead, it will usually suffice to maintain a dynamic replication graph which has the property that avoiding a cycle in this graph suffices to ensure serializability.

Figure 2B:
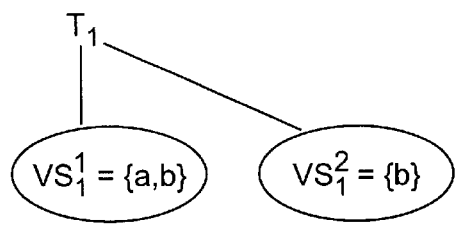

FIGS. 2B through 2F show the state of the replication graph at different points in time in the execution of the global schedule of physical sites $s_1$ and $s_2$ of FIG. 2A. FIG. 2B shows the replication graph after step $c_1^1$ of the global schedule. At this point, the transaction $T_1$ has committed at site $s_1$ but has not completed, while transactions $T_2$ and $T_3$ have not yet started. The replication graph of FIG. 2B includes nodes corresponding to transaction $T_1$ and virtual sites $VS_1^1$ and $VS_1^2$, and two edges $<VS_1^1, T_1>$ and $<VS_1^2, T_1>$. The virtual site $VS_1^1$ includes the set of data items $\{a, b\}$ accessed by transaction $T_1$ at physical site $s_1$ from its initial operation to that point in the global schedule, while the virtual site $VS_1^2$ includes the data item $\{b\}$ accessed by transaction $T_1$ at physical site $s_2$.

Figure 2C:
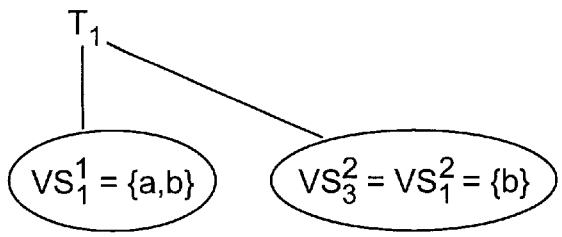
Figure 2D:
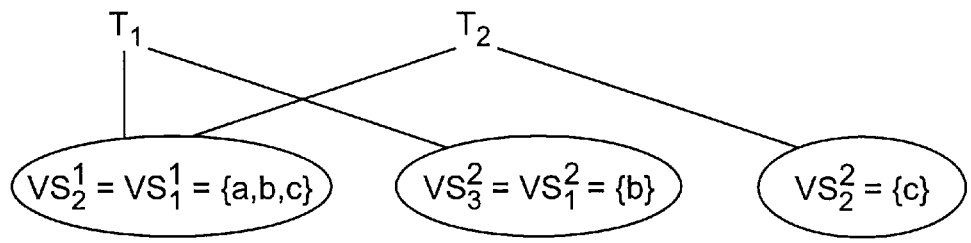
Figure 2E:
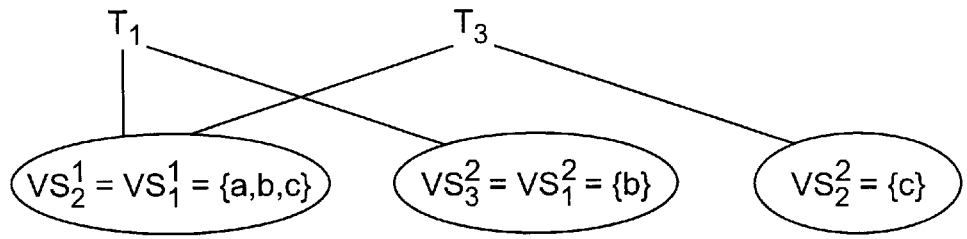
Figure 2F:
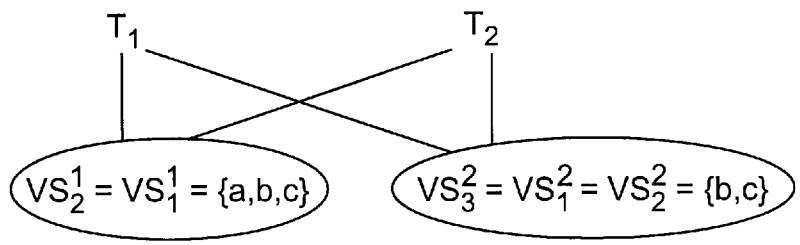

FIG. 2C shows the replication graph after step $c_1^2$, at which point $T_1$ has committed at sites $s_1$ and $s_2$ but has not completed, while transaction $T_2$ has not yet started, and transaction $T_3$ has started and precedes $T_1$ in the execution order at site $s_2$. FIG. 2D shows the replication graph after step $c_2^1$, at which point $T_1$ is still committed everywhere but not completed, while transaction $T_2$ has committed at site $s_1$ but has not completed, and transaction $T_3$ remains active and precedes $T_1$ in the execution order at site $s_2$. The replication graph of FIG. 2D includes nodes corresponding to transactions $T_1$, $T_2$ and virtual sites $VS_2^1=VS_1^1$, $VS_3^2=VS_1^2$, $VS_2^2$, and four edges $<VS_2^1, T_1>$, $<(VS_3^2, T_1>$, $<VS_2^1, T_2>$ and $(VS_2^2, T_2>$. The virtual site $VS_2^1$ includes the set of data items {a, b, c}, the virtual site $VS_3^2$ includes the data item {b}, and the virtual site $VS_2^2$ includes the data item {c}. FIG. 2E shows the replication graph after step $c_2^2$, at which point both $T_1$ and $T_2$ have committed everywhere but have not completed, while transaction $T_3$ still remains active and precedes $T_1$ in the execution order at site $s_2$. FIG. 2F shows the replication graph after submission of step $c_3^2$. At this point, the replication graph includes a cycle as shown. A test performed on the replication graph in conjunction with, for example, box 72 of the protocol described in conjunction with FIG. 4A below, indicates the presence of the cycle. As a result of the cycle, transaction $T_3$ submits the abort operation. The transactions $T_1$ and $T_2$ are then able to complete after $T_3$ aborts.

A reduction procedure for a replication graph constructed for a global schedule S may be as follows. When a transaction completes, the transaction and all edges incident thereon are removed from the graph, and the split rule is applied to the graph. If a virtual site node of the graph does not have any edges incident on it, that node is removed from the graph. The resulting graph obtained by application of this reduction procedure is called the reduced graph of schedule S. It can be shown that if S is a complete global schedule over a set of transactions T, such that each transaction in the schedule is either committed or aborted, then S is globally serializable if and only if its reduced replication graph is empty.

A drawback of conventional global serializability protocols is that significant additional communication is generally required among physical sites to coordinate replica propagation with the execution of local transactions. This communication overhead is usually unavoidable if nothing is known about the transactions in advance. However, if each transaction declares its access set of data items before it starts executing, then it is possible to use the replication graph in such a way that coordination during transaction execution is avoided. Consider a set of transactions T. For each transaction $T_i$ in T, $d(T_i)$ is defined as the set of data items accessed by transaction $T_i$i. Let VS denote the set of virtual sites built from $d(T_i)$ using the union rule. A replication graph G(T) may be constructed whose set of transactions is T and whose set of virtual sites is VS. For a given set of transactions T, the graph G(T) is unique. It can be shown that if G(T) is acyclic, then any global schedule over T is either serializable or can be made serializable by ignoring ww conflicts on secondary copies of data items. If the graph G(T) contains a cycle, then there is a global schedule over T that is not serializable even if ww conflicts on secondary copies of data items are ignored. The invention provides concurrency-control protocols which make use of the above observations. The protocols may make use of the Thomas Write Rule (TWR) for handling ww conflicts on secondary copies of data items. The TWR is described in greater detail in P. A. Bernstein, V. Hadzilacos and N. Goodman, "Concurrency Control and Recovery in Database Systems," Addison-Wesley, Reading, Mass., 1987.

Figure 3:
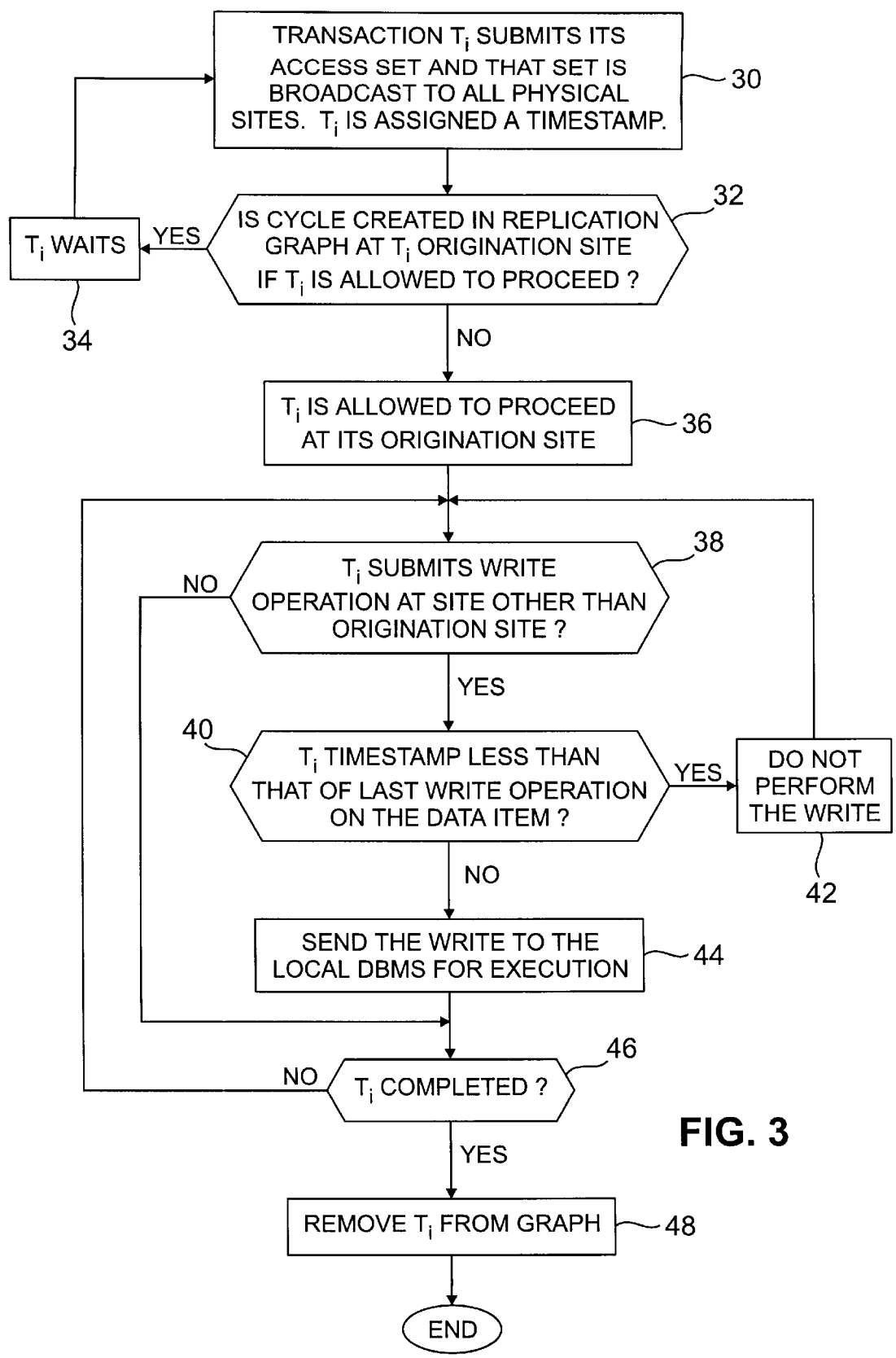
FIG. 3 is a flow diagram illustrating an exemplary static global serializability (SGS) protocol suitable for use in the database system of FIG. 1 in accordance with the invention.

FIG. 3 is a flow diagram illustrating a first exemplary concurrency-control protocol in accordance with the invention. The exemplary protocol is referred to as a static global serializability (SGS) protocol, and uses the above-described virtual site and replication graph techniques to generate a global schedule. The SGS protocol generates and maintains a replication graph for at least a portion of a schedule of transactions using replicated data items at multiple sites. Although illustrated as applied to a single transaction, the protocol will generally be used to process multiple transactions in parallel.

In step 30 of FIG. 3, a transaction $T_i$ at a particular physical site $s_j$ submits its access set of data items, which will be processed in accordance with one or more operations of $T_i$. The operations may be submitted to a processor such as a processor 18-j associated with physical site $s_j$ in the distributed database system 10, or may be generated in accordance with a software program executed by the processor 18-j. The access set of transaction $T_i$ is broadcast to all the physical sites in the system, and the transaction $T_i$ is assigned a timestamp indicative of the time at which $T_i$ submits its access set. In step 32, a determination is made at the origination site of transaction $T_i$ as to whether a cycle will be created in a replication graph if $T_i$ is allowed to proceed with execution of its operations. If such a cycle will be created, step 34 indicates that $T_i$ waits and is not allowed to start execution of its operations. After waiting for a designated period of time, the transaction $T_i$ may then return to step 30 as shown in order to resubmit its access set and be assigned a new timestamp.

If it is determined in step 32 that no cycle will be created in the replication graph, $T_i$ is allowed to proceed with execution at its origination site, as shown in step 36. In step 38, a determination is made as to whether $T_i$ has submitted a write operation at a physical site other than its origination site. If it has, the timestamp of $T_i$ is compared in step 40 to the timestamp of the transaction executing the last write operation on the same data item. If the $T_i$ timestamp is less than that of the transaction with the last write operation on the data item, step 42 indicates that the write operation is not performed, and the process returns to step 38 to analyze subsequent operations of $T_i$. The write operation is thus not performed if another transaction starting after $T_i$ has already executed a write to the same data item. If the $T_i$ timestamp is not less than that of the transaction with the last write operation on the data item, the write operation is sent in step 44 to the local database management system of the appropriate site for execution. A determination is then made in step 46 as to whether $T_i$ has completed. If it is determined in step 38 that $T_i$ has not submitted a write operation at a site other than its origination site, the process moves directly to step 46, bypassing steps 40 and 44. If it is determined in step 46 that $T_i$ has completed, $T_i$ and any of its associated edges are removed from the replication graph, and the process ends for transaction $T_i$. If $T_i$ has not completed in step 46, the process returns to step 38 to analyze subsequent operations of $T_i$.

The SGS concurrency-control protocol illustrated in FIG. 3 guarantees global serializability. It will be apparent to those skilled in the art that the SGS protocol does not require any global coordination of individual operations nor of transaction commits. The test in steps 30 and 32 as to whether a given transaction $T_i$ can start execution may be considered a preprocessing step. By distributing the access set of data items for a given transaction $T_i$ to each of the physical sites in the system, each site can construct an identical copy of the replication graph. As a result, all physical sites should arrive at the same decision as to whether a given transaction can proceed.

Figure 4A:
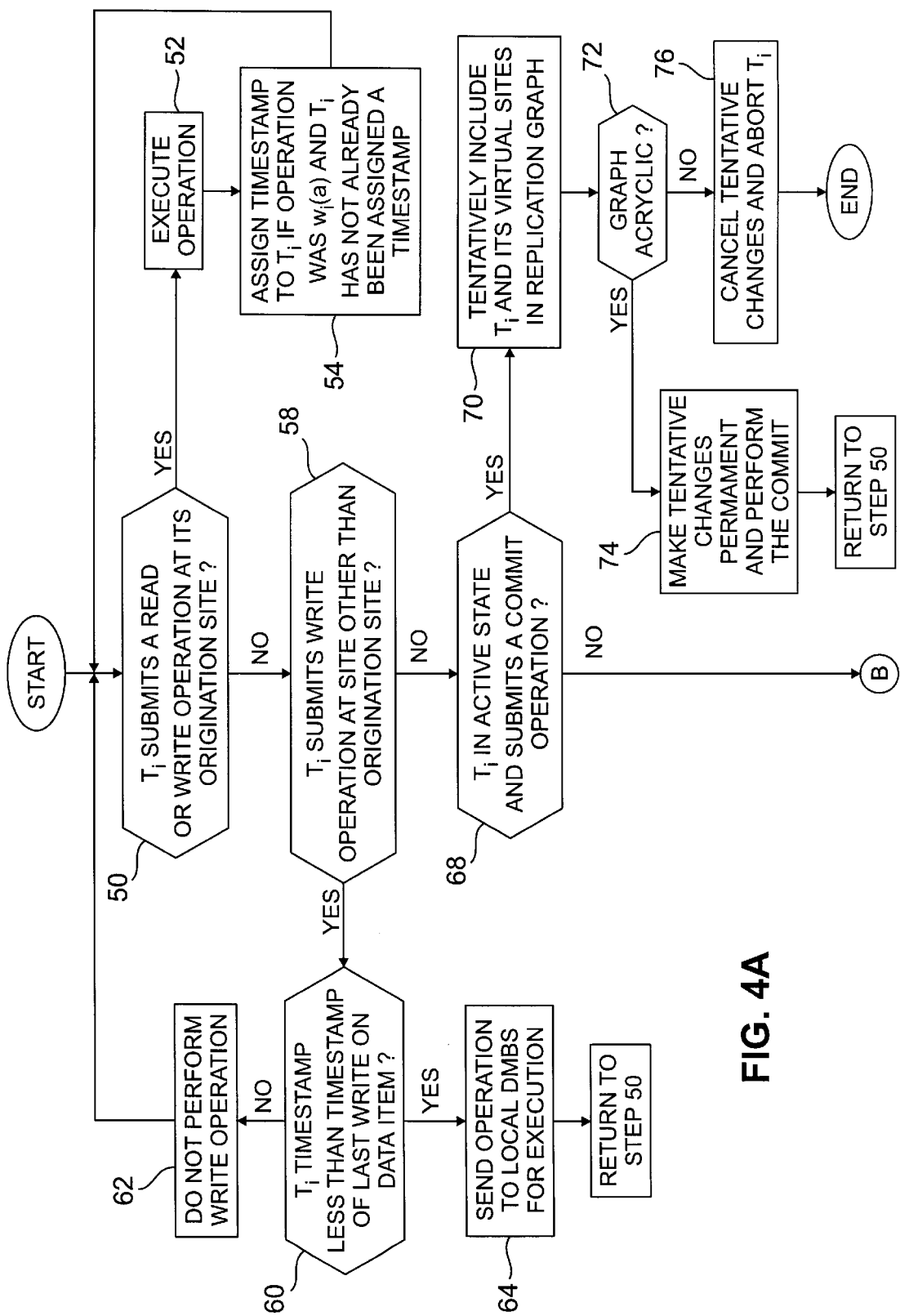
FIGS. 4A and 4B comprise a flow diagram illustrating an exemplary commit-oriented protocol (COP) suitable for use in the database system of FIG. 1 in accordance with the invention.
Figure 4B:
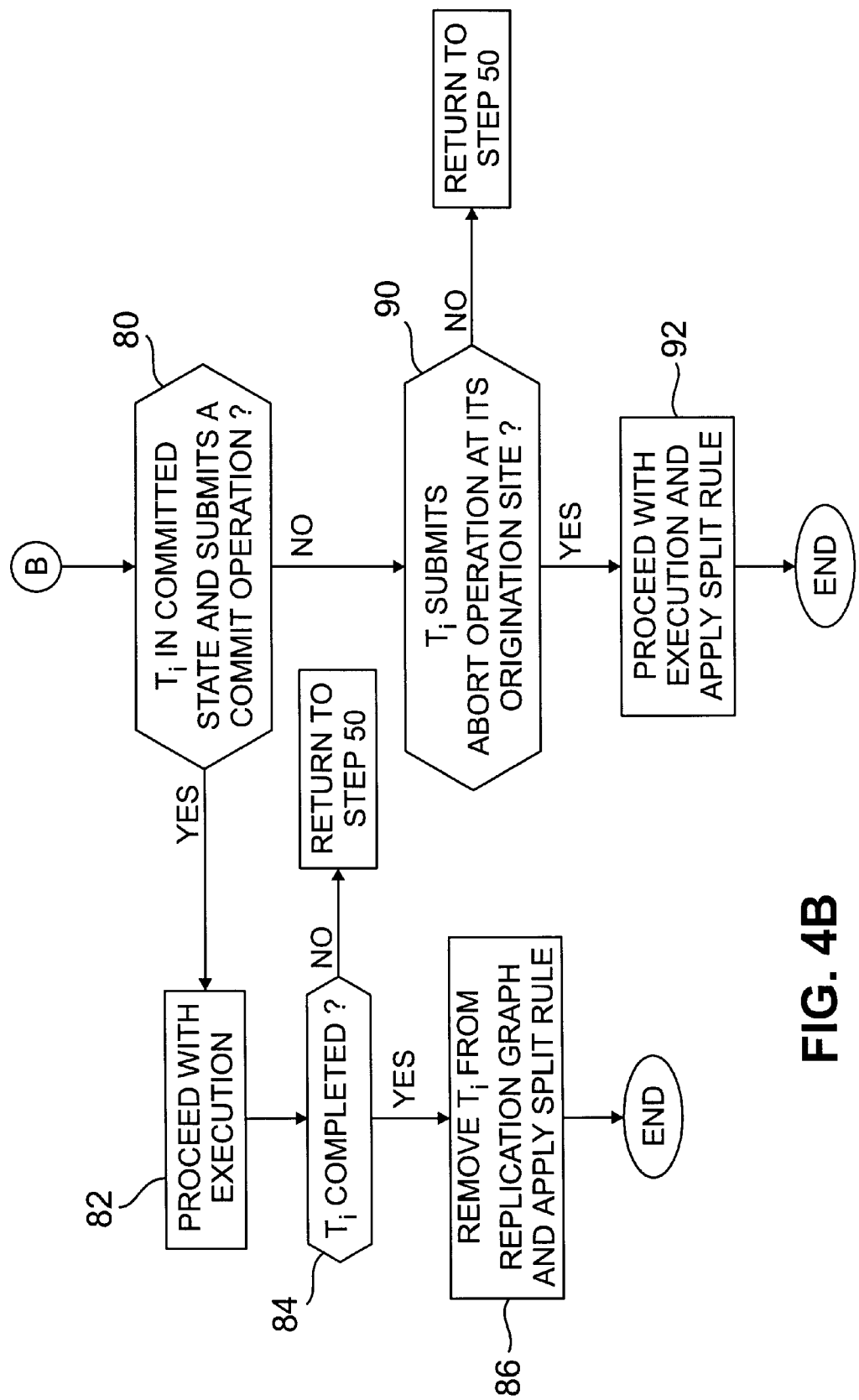

FIGS. 4A and 4B comprise a flow diagram illustrating a second concurrency protocol of the invention, referred to as the commit-oriented protocol (COP). The COP protocol utilizes an "optimistic" approach in which updates to the replication graph are distributed to the physical sites on a best-effort basis. This embodiment of the invention guarantees global serializability and can be configured using only two messages per transaction. The COP protocol generally allows each transaction to proceed at its origination site independently of other transactions that are executing at other physical sites. The only coordination required in this illustrative embodiment is when a transaction submits the commit operation at its origination site.

The portion of the COP protocol shown in FIGS. 4A and 4B assumes that a given transaction $T_i$ is already executing, and that an access set of data items is maintained for $T_i$ at each physical site of the system. The process steps are performed repeatedly for $T_i$ until it completes or aborts. In step 50, a determination is made as to whether $T_i$ has submitted a read or write operation at a site other than its origination site. If it has, the operation is executed in step 52. A timestamp is assigned to $T_i$ if the operation was a write operation $w_i(a)$, where a is a replicated copy of a data item, assuming $T_i$ has not already been assigned a timestamp. The process then returns to step 50 as shown for processing subsequent operations of $T_i$. If step 50 indicates that $T_i$ has not submitted a read or write operation at its origination site, step 58 determines whether $T_i$ has submitted a write operation at a site other than its origination site. If it has, the $T_i$ timestamp is compared in step 60 to the timestamp of the transaction with the last write on the same data item. If the $T_i$ timestamp is not less than the timestamp of the transaction with the last write on the same data item, the write operation of $T_i$ is not performed, as shown in step 62, and the process returns to step 50. Otherwise, the write operation of transaction $T_i$ is sent to local DBMS of the appropriate physical site for execution, as shown in step 64, and the process then returns to step 50 for processing any subsequent operations of transaction $T_i$.

If step 58 indicates that $T_i$ has not submitted a write operation at a site other than its origination site, step 68 determines whether $T_i$ is in the active state and has submitted a commit operation. If it has, $T_i$ and its virtual sites are tentatively included in the replication graph as shown in step 70, and a determination is made in step 72 as to whether the resulting graph is acyclic. If it is acyclic, the tentative changes are made permanent and the commit is performed as shown in step 74, and the process returns to step 50. Otherwise, the tentative changes made to the replication graph in step 70 are canceled and the transaction $T_i$ is aborted, as shown in step 76, and the process ends for $T_i$.

If step 68 indicates that $T_i$ has not submitted a commit operation in the active state, step 80 of FIG. 4B determines whether $T_i$ is in a committed state and has submitted a commit operation. If it has, the execution of the commit operation proceeds in step 82. Step 84 then determines whether $T_i$ has completed as a result of execution of the commit operation. If $T_i$ has completed, $T_i$ and any edges incident thereon are removed from the replication graph and the split rule is applied to reduce the size of the virtual sites, as shown in step 86. The process then ends for the transaction $T_i$. If $T_i$ has not completed, the process returns to step 50 of FIG. 4A to analyze subsequent operations of $T_i$.

If step 80 indicates that $T_i$ has not submitted a commit operation in the committed state, step 90 determines whether $T_i$ has submitted the abort operation at its origination site. If it has, the execution of the abort operation proceeds, and the split rule is applied to reduce the size of the virtual sites, as shown in step 92. The process then ends for transaction $T_i$. Otherwise, the process returns to step 50 for processing subsequent operations of $T_i$ as shown.

The COP protocol of FIGS. 4A and 4B provides a class of schedules which is a superset of schedules generated by the SGS protocol of FIG. 3. It can be shown that if S is a global schedule generated by a conventional global two-phase locking protocol, then S can also be generated by the COP protocol. As previously noted, the COP protocol also guarantees global serializability while reducing communication overhead. In accordance with the COP protocol as illustrated in FIGS. 4A and 4B, none of the transactions is permitted to wait. Consequently, no distributed deadlocks can occur during the transaction processing. Transaction aborts, on the other hand, are permitted to occur. The frequency of transaction aborts is determined by the probability of a transaction generating a cycle in the replication graph. For example, let n denote the number of transactions in the system, q the average number of operations per transaction, and m the total number of data items. If the worst-case scenario is assumed, that is, that each data item is replicated at every physical site, and if it is further assumed that nq<<m, then the probability of transaction abort is on the order of $nq^4/m^2$.

A third illustrative embodiment of the invention, referred to a multiversion optimistic protocol (MOP), guarantees multiversion global serializability as defined in P. A. Bernstein, V. Hadzilacos and N. Goodman, "Concurrency Control and Recovery in Database Systems," Addison-Wesley, Reading, Mass., 1987, and may be implemented using only two versions. Multiversion serializability generally does not depend on wr or ww conflicts, since these conflicts can be eliminated by either reading or writing a different version of the data item. Thus, the only conflicts which need to be considered are rw-conflicts. This embodiment of the invention makes use of the notion of a copy graph. Unlike the undirected replication graph used in the previous illustrative embodiments described in conjunction with FIGS. 3 and 4, the copy graph is a directed graph. If T is a set of transactions and VS is a set of acceptable virtual sites for T, a copy graph G=<T∪VS, E> is a directed, bipartite graph, where E is the set of graph edges. An edge <$VS_i^j$, $T_i$> belongs to the set of graph edges E if and only if $T_i$ updates a primary copy of a replicated data item from $VS_i^j$, and an edge <$T_i$, $VS_i^j$> belongs to E if and only if $T_i$ updates a secondary copy of a replicated data item from $VS_i^j$. The copy graph is used to characterize a set of multiversion serializable global schedules. It can be shown that a schedule S defined over a set of transactions T is multiversion serializable if and only if there is a copy graph for T that is acyclic. Clearly, if a copy graph is cyclic, then the corresponding replication graph is also cyclic. Thus, acyclicity of the replication graph is a stronger requirement than acyclicity of the copy graph.

The MOP concurrency-control protocol of the invention allows read-only transactions to read that version of a data item which was written by the most recent completed transaction to write that data item. That version is referred to as the "last certified version." More particularly, the last certified version of a data item a is that version written by a completed transaction $T_i$ such that any other completed transaction that writes a precedes $T_i$ in the global serialization order. This effectively serializes read-only transactions in a specific position in the global serialization order without introducing any rw-conflicts. As noted previously, it is only rw-conflicts which can cause cycles in the copy graph. As a result, the MOP protocol can be implemented using only two versions of a data item, the current version and the last certified version.

The MOP concurrency control protocol is implemented using the following two rules. First, read-only transactions read the last certified version of a data item and are never delayed. Second, all other transactions follow the COP protocol illustrated in conjunction with FIGS. 4A–4B and access the current version of a data item, with the additional requirement that, when a transaction $T_i$ enters the completed state, each data item updated by $T_i$ has its last certified version set to be the version updated by $T_i$. It can be shown that this illustrative MOP protocol generates a one-copy serializable global schedule using at most two versions.

A number of implementation issues relating the above-described exemplary SGS, COP and MOP concurrency-control protocols will now be addressed. Message overhead will be addressed first. The physical propagation of update values to secondary physical sites can begin as soon as a write operation has been executed at the primary site. The protocols of the invention may be implemented to restrict only the time at which the updates may be applied to secondary copies. This allows increased parallelism in update propagation at the cost of some wasted work if a global transaction aborts. In such cases, the messages pertaining to the aborted transaction are purged from queues at the secondary sites. No updates can have been actually applied at these secondary sites given that the transaction has not committed at its origination site. Aside from update propagation, the maintenance of the replication graph represents the primary source of message overhead.

In order to estimate the message costs of the above-described SGS, COP and MOP protocols, it is helpful to distinguish between long messages that contain graph data and short messages that contain only an acknowledgment, notification of commit or abort, and the like. The transfer of the data itself will be ignored during the estimation because it is substantially the same for all of the protocols. The SGS, COP and MOP protocols generally require graph maintenance only twice per transaction: (1) prior to the start of a transaction (SGS protocol) or at the time a protocol attempts to commit at its origination site (COP and MOP protocols), and (2) after the transaction completes or aborts. For all of the protocols, commits by a transaction at a secondary physical site generally must be communicated, once no active transaction precedes the commit, so that it can be determined when a transaction enters the committed state. To provide an approximate cost estimate for the protocols, a number of simplifying uniformity assumptions may be made. Assume that the system includes n physical sites, each of which processes t global transactions per second, and that each transaction updates replicated data at m of the n physical sites. The length in bytes of the long and short messages are L and l, respectively. The estimates will be made for both centralized graph maintenance and distributed graph maintenance.

In an implementation with centralized graph maintenance by a central scheduler, the protocols require one long message per transaction from its origination site to the central scheduler, either before the start of a transaction in the SGS protocol or when a transaction attempts to commit at its origination site in the case of the COP and MOP protocols. The scheduler responds with a short message containing permission to proceed or denial of permission to proceed. Whenever a transaction commits at a secondary physical site, that site informs the scheduler via a short message. Since a transaction cannot commit at a secondary site before it commits at the origination site, there is no need for a short message from the origination site to the scheduler. Thus, there are m-1 commit messages, a total of one long and m short messages per transaction, and nt transactions submitted every second somewhere in the system. The communication overhead of the protocols is therefore $nt \cdot (L+ml) = ntL + mntl$ bytes per second. If it is assumed that L=5 KB and l=1 KB, and that 10 sites run 100 transactions per second, each of which updates data at 5 sites, the communication overhead is 10 MB/sec. The invention thus provides a significant reduction in message overhead relative to, for example, conventional approaches based on global locking. For example, the approach described in J. Gray, P. Helland, P. O'Neil and D. Shasha, "The Dangers of Replication and a Solution," Proceedings of ACM-SIGMOD 1996 International Conference on Management of Data, Montreal, Quebec, pp. 173–182, 1996, uses about mnrTl bytes per second, where r is the number of data items accessed per transaction, and T is the total number of transactions, including local transactions. In most cases, T is substantially greater than t, such that the protocols of the invention reduce message overhead by more than a factor of r. Techniques such as grouping several short message into a single longer message can also be used to further reduce the overhead.

An implementation with distributed graph maintenance will now be considered. The distributed graph maintenance will be described in the context of the COP and MOP protocols, in which graph updates occur when a transaction is about to commit at its origination site. The extension to the SGS protocol is straightforward. In order to synchronize graph updates, each transaction that is ready to commit is assigned a global timestamp, which is broadcast to all physical sites. This timestamp specifies the order in which transactions enter the committed state and allows all sites to agree as to the next transaction to attempt to commit. When a transaction attempts to commit, it tests locally for a cycle in the replication graph and then broadcasts its timestamp along with the decision, either commit or abort. If the decision is to commit, the changes to the replication graph are included in the decision message. This technique depends on the availability of a cheap broadcast mechanism similar to that found in a local area network. There are two broadcasts per transaction, each of which is a long message. The communication overhead for this implementation is 2ntL. Without broadcast, updates are passed from site to site, with each site incorporating its own changes into the message. In either case, the technique incurs the overhead of sending short messages regarding the completion of transactions at secondary sites.

A number of possible failure modes will now be considered, including data item failure, physical site failure and disconnection of a mobile host or other physical site. A data item failure means that a data item is not available for access. If it is the primary copy of the data item that is not available, then any global transactions that have read but not updated the data item before it failed are either aborted or made to wait until the data item becomes operational. Either of these approaches will work, since the other copies of the data item can only be read, and the local DBMS may thus choose either course of action. If the update has already occurred, there is no impediment to the global transaction eventually completing. In any case, recovery from failed data items does not require any additional recovery procedures at the global level.

An alternative approach to primary data item failure involves selecting a new primary copy of the data item from among the secondary copies. This can be done via delegation. That is, each physical site may include an ordered list of primary copy sites for each data item. These lists may be static and therefore are easily applied at each site when a failure is detected. When the original primary copy is recovered, a message is broadcast to each physical site. After each site responds to the message, the original primary copy regains its status by revoking primary copy authority from the backup primary copy. Such an approach ensures that the protocols of the invention are robust in the presence of primary copy data item failures.

If a secondary copy of a data item fails, then any transactions that originated at the site where the failure occurred, and need to access the data item, are aborted. It should be noted that such an abort does not cause a violation of global serializability. If a transaction that is trying to access a failed data item is global, then it has not yet distributed its updates and as a result its abort cannot cause any aborts elsewhere in the system. If a transaction that is trying to access a failed data item is local, then its abort also cannot cause global serializability violations. In a case in which a transaction that needs to access a failed secondary copy did not originate at the site of failure, an abort of the replica-propagation sub-transaction would generally not create nonserializability, since the transaction would still be present in the replication graph. After the failed data item becomes available, the aborted sub-transaction may be restarted.

The protocols may also be configured to accommodate site failures. In an implementation with centralized graph maintenance by a central scheduler, the scheduler should be mirrored at a backup physical site to ensure fault tolerance. To avoid doubling the communication overhead, the primary and backup schedulers should be tightly coupled. All three of the illustrative protocols described herein are immune to site failures other than failure of the central scheduler. If a particular physical site fails, then all active transactions at that site fail as well, and these transactions are removed from the replication or copy graph. The only transactions at the failed site that remain in the graph are those that have committed but cannot yet be removed from the graph. None of these transactions can cause any changes in the graph, since any operations that they submit cannot lead to additional edges in the graph. Site failure may result in some transactions that have completed their operations remaining in the graph, pending update of secondary copies at the failed site. The latter may lead to a graph that contains transactions waiting for a failed site to be restored, and may therefore cause blocking. A possible solution is to remove a transaction from the graph if it has committed at all but a failed site and if it can be removed from the graph disregarding the failed site. After the failed site recovers, the secondary copies are updated in the same serialization order as they would have been if the site had not failed. This may be done before the site is re-opened for operations, as part of a recovery procedure.

Disconnection of a single physical site, as in the case of a mobile computer disconnecting from a network, is an example of a type of network partition which the protocols of the invention can tolerate easily. If a disconnected site does not contain a primary copy for any data item, then only read transactions can originate at the disconnected site. Since the site is disconnected, none of its data items can be updated. Thus, each read transaction will read a consistent, though possibly not recent, secondary copy. To ensure data availability, the latest committed version of the secondary copies of the data should be copied from the primary sites prior to disconnection. A timestamping technique may be used to avoid unnecessary copying of data. If a disconnected site does contain one or more primary copies of data items, the disconnection could be treated by transactions originating at other sites in a manner similar to that described above for primary data item failure. At the disconnected site, transactions may be allowed to proceed based on the latest copy of the replication graph available to the site. However, none of the transactions originating at the disconnected site is allowed to commit until the site reconnects. After the connection is restored, the replication or copy graph of the disconnected site is merged with the current graph. If the resulting graph is acyclic, each of the transactions from the formerly disconnected site is committed. Otherwise, transactions that introduce a cycle in the graph are aborted and the formerly disconnected site is notified.

The above-described embodiments of the invention are intended to be illustrative only. Numerous alternative embodiments may be devised by those skilled in the art without departing from the scope of the following claims.

What is claimed is:

1. A method of managing a plurality of transactions in a distributed database system storing a plurality of data items and including a plurality of physical sites, each of the transactions originating at one of the physical sites, the plurality of transactions including a number of global transactions each being processed at multiple physical sites, the method including the steps of:

specifying sets of data items such that a given set $S_i^j$ of data items at a particular point in time includes replicated data items at a physical site $s_j$ that a given transaction $T_i$ has accessed from an initial operation up to the point in time;

maintaining a representation of relationships between the transactions and the sets of data items; and permitting the transaction $T_i$ to enter a completed state even if $T_i$ has not finished updating all replicated data items in the sets of data items associated with $T_i$, wherein $T_i$ and any sets of data items $S_i^j$ associated therewith are removed from the representation when $T_i$ enters the completed state, such that consistency among the replicated data items is maintained.

2. The method of claim 1 wherein $T_i$ is in the completed state if $T_i$ is not preceded by any non-completed transaction in a local serialization order at a physical site $s_j$ at which $T_i$ executes, and (i) $T_i$ has executed its serialization point operation at each physical site at which it executes; or (ii) $T_i$ has committed at each physical site at which it executes.

3. The method of claim 1 wherein the representation includes a first set of identifiers for at least a subset of the transactions, a second set of identifiers for at least a subset of the sets of data items, and a connection between an identifier corresponding to the transaction $T_i$ and an identifier corresponding to the set $S_i^j$ if a schedule of transaction operations includes a write operation by the transaction $T_i$ on a data item in the set $S_i^j$.

4. The method of claim 3 wherein the representation of the relationships between the transactions and the sets of data items is in the form of a graph, the graph including a first set of nodes corresponding to the first set of identifiers for the transactions, a second set of nodes corresponding to the second set of identifiers for the sets of data items, and a connection between a node corresponding to the transaction $T_i$ and a node corresponding to the set $S_i^j$ if the schedule of the transaction operations includes a write operation by the transaction $T_i$ on a replicated data item in the set $S_i^j$.

5. The method of claim 1 wherein each of the transactions reads data items only at the physical site at which the transaction originates, and only transactions originating at a physical site at which a primary copy of a data item is located are permitted to update that data item.

6. The method of claim 1 further including the steps of:

assigning a timestamp to transaction $T_i$ when $T_i$ submits an access set of data items;

broadcasting the access set of data items to all physical sites in the system; and permitting $T_i$ to proceed to execution at its origination site if it is determined that the representation will be acyclic if $T_i$ proceeds to execution.

7. The method of claim 6 further including the steps of:

when $T_i$ submits a write operation on a secondary copy of a data item, comparing the timestamp of $T_i$ to that of another transaction which executed the last write operation on the same data item; and executing the write operation of $T_i$ only if the $T_i$ timestamp is less than that of the transaction which executed the last write on the data item.

8. The method of claim 1 further including the steps of:

permitting each transaction to proceed at its origination site independently of other transactions that are executing at other sites;

when a given transaction $T_i$ submits a commit operation at its origination site, making tentative updates to the representation to include the transaction $T_i$ and its associated sets of data items;

making the tentative changes permanent if the resulting representation is acyclic; and aborting transaction $T_i$ if the resulting representation is not acyclic.

9. The method of claim 1 further including the steps of:

providing first and second versions of each of a plurality of data items in the system, the first version representing a current version of a given data item, and the second version representing a last certified version of the given data item; and permitting read-only transactions to read only the last certified version of the given data item.

10. The method of claim 9 wherein the last certified version of the given data item is a version written by a completed transaction $T_i$ such that any other completed transaction that writes the given data item precedes $T_i$ in a global serialization order.

11. An apparatus for use in a distributed database system for storing a plurality of data items and controlling access to the data items at a plurality of physical sites configured to communicate over a network, comprising:

at least one processor for managing a plurality of transactions involving the data items, each of the transactions originating at one of the physical sites, wherein the processor is operative to specify sets of data items such that a given set $S_i^j$ of data items at a particular point in time includes replicated data items at a physical site $s_j$ that a given transaction $T_i$ has accessed from an initial operation up to the point in time; to maintain a representation of relationships between the transactions and the sets of data items; and to permit the transaction $T_i$ to enter a completed state even if $T_i$ has not finished updating all replicated data items in the sets of data items associated with $T_i$, wherein $T_i$ and any sets of data items $S_i^j$ associated therewith are removed from the representation when $T_i$ enters the completed state, such that consistency among the replicated data items is maintained.

12. The apparatus of claim 11 wherein $T_i$ is in the completed state if $T_i$ is not preceded by any non-completed transaction in a local serialization order at a physical site $s_j$ at which $T_i$ executes, and (i) $T_i$ has executed its serialization point operation at each physical site at which it executes; or (ii) $T_i$ has committed at each physical site at which it executes.

13. The apparatus of claim 11 wherein the representation includes a first set of identifiers for at least a subset of the transactions, a second set of identifiers for at least a subset of the sets of data items, and a connection between an identifier corresponding to the transaction $T_i$ and an identifier corresponding to the set $S_i^j$ if a schedule of transaction operations includes a write operation by the transaction $T_i$ on a data item in the set $S_i^j$.

14. The apparatus of claim 13 wherein the representation of the relationships between the transactions and the sets of data items is in the form of a graph, the graph including a first set of nodes corresponding to the first set of identifiers for the transactions, a second set of nodes corresponding to the second set of identifiers for the sets of data items, and a connection between a node corresponding to the transaction $T_i$ and a node corresponding to the set $S_i^j$ if the schedule of the transaction operations includes a write operation by the transaction $T_i$ on a replicated data item in the set $S_i^j$.

15. The apparatus of claim 11 wherein each of the transactions reads data items only at the physical site at which the transaction originates, and only transactions originating at a physical site at which a primary copy of a data item is located are permitted to update that data item.

16. The apparatus of claim 11 wherein the processor is further operative to assign a timestamp to transaction $T_i$ when $T_i$ submits an access set of data items; to broadcast the access set of data items to all physical sites in the system; and to permit $T_i$ to proceed to execution at its origination site if it is determined that the representation will be acyclic if $T_i$ proceeds to execution.

17. The apparatus of claim 16 wherein the processor is further operative, when $T_i$ submits a write operation on a secondary copy of a data item, to compare the timestamp of $T_i$ to that of another transaction which executed the last write operation on the same data item; and to execute the write operation of $T_i$ only if the $T_i$ timestamp is less than that of the transaction which executed the last write on the data item.

18. The apparatus of claim 11 wherein the processor is further operative to permit each transaction to proceed at its origination site independently of other transactions that are executing at other sites; when a given transaction $T_i$ submits a commit operation at its origination site, to make tentative updates to the representation to include the transaction $T_i$ and its associated sets of data items; to make the tentative changes permanent if the resulting representation is acyclic; and to abort transaction $T_i$ if the resulting representation is not acyclic.

19. The apparatus of claim 11 wherein the processor is further operative to provide first and second versions of each of a plurality of data items in the system, the first version representing a current version of a given data item, and the second version representing a last certified version of the given data item; and to permit read-only transactions to read only the last certified version of the given data item.

20. The apparatus of claim 19 wherein the last certified version of the given data item is a version written by a completed transaction $T_i$ such that any other completed transaction that writes the given data item precedes $T_i$ in a global serialization order.

* * * * *